Patented Mar. 31, 1931

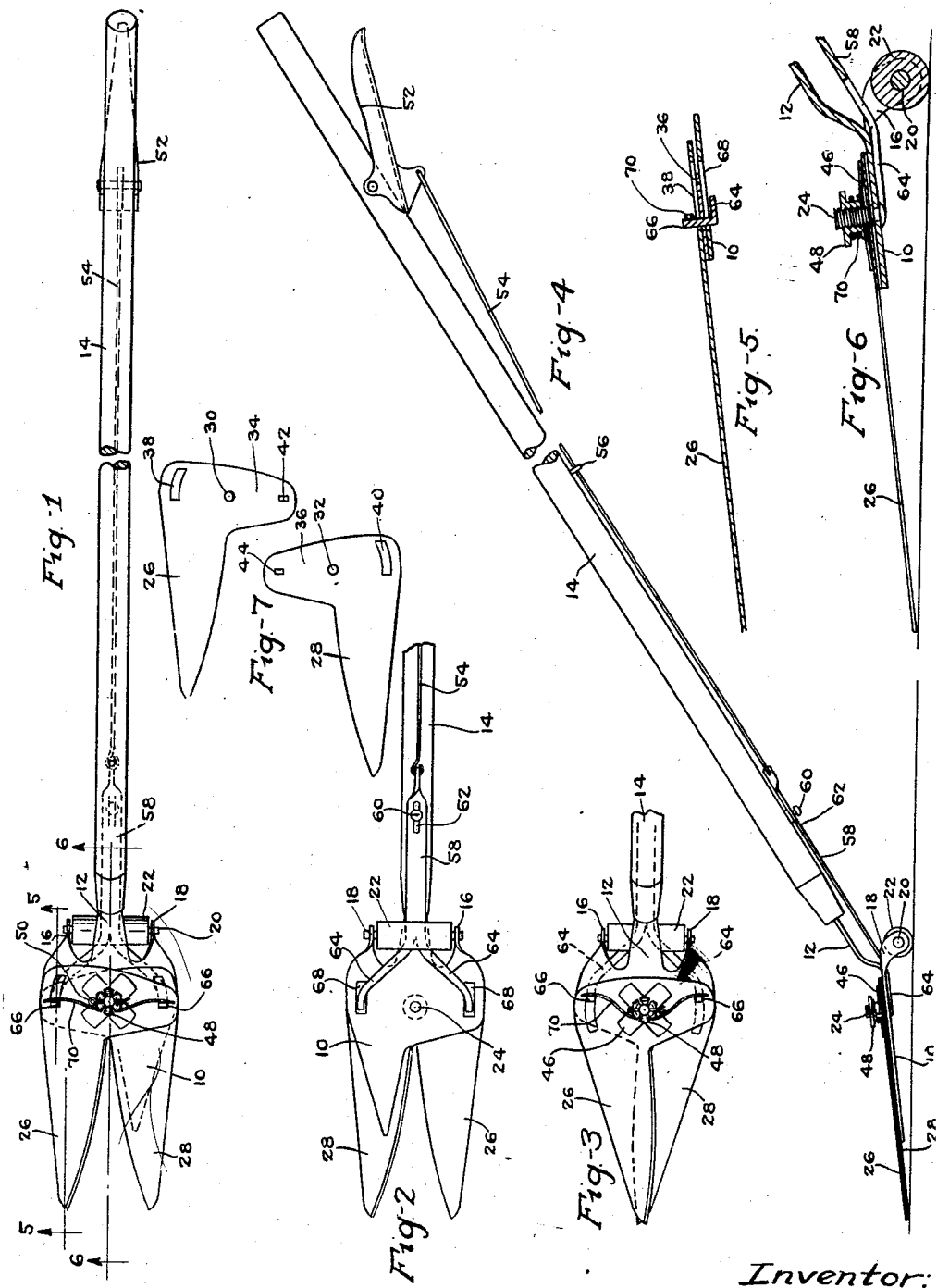

1,798,320

UNITED STATES PATENT OFFICE

JOHN E. ERICKSON, OF ST. PAUL, MINNESOTA

EDGE TRIMMER FOR LAWNS

Application filed September 3, 1929. Serial No. 389,883.

My invention relates to edge trimmers for lawns, and it relates particularly to devices for trimming the edges of lawns or other places in which the grass is not cut smoothly by the lawn mower which is customarily employed. Among the objects of the invention are the provision of a supporting plate for the cutting blades of the device, means whereby the cutting blades are held together resiliently under spring tension which may be adjusted, and means whereby the cutting blades may be readily removed for sharpening.

The full objects and advantages of my invention will appear in connection with the detailed description thereof, and the novel features of my inventive idea will be particularly pointed out in the claims.

In the accompanying drawings which illustrate one form in which my invention may be embodied,—

Fig. 1 is a top plan view of the device. Fig. 2 is a bottom plan view of the cutting portion of the device in open position. Fig. 3 is a top plan view of the cutting portion of the device in closed position. Fig. 4 is an elevational view of the device. Fig. 5 is a view in section on the line 5—5 of Fig. 1 and on an enlarged scale. Fig. 6 is a view in section on the line 6—6 of Fig. 1 and on an enlarged scale. Fig. 7 is a detail view showing the two cutting blades separated from each other.

Referring to the construction shown in the drawings, the numeral 10 designates a supporting plate having the shape best shown in Fig. 2 and having a rearwardly extending upwardly offset tang 12 which is secured in the lower end of a handle member 14 as shown in Fig. 4. The plate 10 at its rear is provided with a pair of spaced downwardly extending ears 16 and 18 which are perforated to constitute bearings for the shaft 20 of a roller 22. A threaded stud 24 extending up from the plate 10 as best shown in Fig. 6 constitutes a pivot for a pair of crossed cutting blades 26 and 28 having the shape best shown in Fig. 7 which shows them separated from each other. The blades 26 and 28 are provided with holes 30 and 32 respectively through which the stud 24 extends when the blades are placed in assembled position. The holes 30 and 32 are located between the main portions of the blades and arms 34 and 36 extending inwardly substantially at right angles to the main portions respectively. The blades outwardly from the holes 30 and 32 are provided with arcuate slots 38 and 40 while inwardly from these holes, the arms 34 and 36 are provided with apertures 42 and 44. After the blades have been placed in position on the stud 24, a spring washer 46 is placed thereon and a flanged nut 48 is screwed down upon the washer to hold the blades together resiliently. A cotter pin 50 is then passed through holes in the stud and nut to hold the latter in adjusted position. A hand-engageable lever 52 is pivoted to the upper end of the handle member 14. A rod 54 is attached at its upper end to the lower end of the lever 52 and after passing through a guide 56 on the handle member has its lower end attached to a bar 58 slidably attached to the handle member by means of a screw 60 passing through a slot 62 in the bar and screwed into the handle member. The lower end of the bar 58 is forked to provide branches 64 whose lower end portions are bent upwardly to provide lugs 66 as shown in Fig. 5. These lugs after passing up through slots 68 in the plate 10 pass through the aperture 44 and the slot 38 on one side of the pivot 24 and through the slot 40 and the aperture 42 on the other side of the pivot. In order to normally hold the blades 26 and 28 in open position as shown in Fig. 1, a spring 70 has its middle portion coiled around the flanged nut 48 as shown in Fig. 6 while the ends of this spring engage back of the two lugs 66 as best shown in Fig. 5.

The operation and advantages of my invention will be obvious in connection with the foregoing description. The operator grasps the upper portion of the handle member 14 with one of his hands on the lever 52 and pushes the device along the ground. Since the cutting blades rest upon the supporting plate 10 which carries the ground-engaging roller 22, the height at which the grass is cut may be readily varied by tilting the handle member 14 upwardly or downwardly. The blades are quickly brought together to make the cut by pulling on the lever 52. Upon releasing this lever, the blades are quickly opened by the spring 70 so as to be ready to make another cut. It will be understood that upon removing the cotter pin 50, the nut 48 may be turned up or down to adjust the tension with which the cutting blades are held together and upon completely unscrewing the nut 48, the blades may be removed for shapening.

By referring to Fig. 2 of the drawings, it will be seen that the supporting plate 10 at one side of the pivot 24 is forwardly extended so as to project underneath the lower blade 2 for a considerable portion of the length thereof. In practice, I have found that the length of the forwardly extended portion of the plate 10 should preferably be at least half the length of the cutting edges of the blades and that the edges of said forwardly extending portion should preferably converge so as to meet in a point at the forward end thereof. I have found that the provision of this forwardly extending supporting plate prevents the grass which is being cut from pulling the cutting blades downwardly and thus insures a clean even cut of the grass.

I claim:

1. An edge trimmer for lawns comprising a handle member, a supporting plate carried by the lower end of said handle member, cutting blades pivotally mounted on said supporting plate, said plate at one side thereof having a forwardly extended portion which projects underneath the lower one of said cutting blades for a considerable portion of the length thereof, spring mechanism for normally holding said cutting blades in open position, a hand-engageable member carried by the upper end of said handle member, and connections between said hand-engageable member and said cutting blades for closing the latter.

2. An edge trimmer for lawns comprising a handle member, a supporting plate carried by the lower end of said handle member, a ground-engaging roller carried by said supporting plate, cutting blades pivotally mounted on said supporting plate, said plate at one side thereof having a forwardly extended portion which projects underneath the lower one of said cutting blades for a considerable portion of the length thereof, spring mechanism for normally holding said cutting blades in open position, a hand-engageable member carried by the upper end of said handle member, and connections between said hand-engageable member and said cutting blades for closing the latter.

3. An edge trimmer for lawns comprising a handle member, a supporting plate carried by the lower end of said handle member, a threaded stud extending up from said supporting plate, cutting blades pivoted on said stud, said plate at one side thereof having a forwardly extended portion which projects underneath the lower one of said cutting blades for a considerable portion of the length thereof, a spring washer on said stud resting upon said blades, a nut adapted to be screwed down upon said washer, spring mechanism for normally holding said cutting blades in open position, a hand-engageable member carried by the upper end of said handle member, and connections between said hand-engageable member and said cutting blades for closing the latter.

4. An edge trimmer for lawns comprising a handle member, a supporting plate carried by the lower end of said handle member, a threaded stud extending up from said supporting plate, cutting blades pivoted on said stud, a spring washer on said stud resting upon said blades, a nut adapted to be screwed down upon said washer, said stud and nut having holes, a cotter pin adapted to pass through said holes when in register for holding said blades under adjustable tension, spring mechanism for normally holding said cutting blades in open position, a hand-engageable member carried by the upper end of said handle member, and connections between said hand-engageable member and said cutting blades for closing the latter.

5. An edge trimmer for lawns comprising a handle member, a supporting plate carried by the lower end of said handle member, cutting blades pivotally mounted on said supporting plate, said plate at one side thereof having a forwardly extended portion which projects underneath the lower one of said cutting blades for a considerable portion of the length thereof, spring mechanism for normally holding said cutting blades in open position, a lever pivoted on the upper end of said handle member, a forked plate slidably mounted on the lower end of said handle member, the branches of the fork being engaged respectively with said cutting blades, and a rod connecting said plate and lever whereby operation of the latter closes said cutting blades.

6. An edge trimmer for lawns comprising a handle member, a supporting plate carried by the lower end of said handle member, said plate containing a pair of slots, a stud extending up from said plate, a pair of crossed cutter blades pivoted on said stud, each of said blades having an arcuate slot and an aperture on opposite sides of the pivot, spring mechanism for normally holding said cutter blades in open position, a lever pivoted on the upper end of said handle member, a forked plate slidably mounted on the lower end of said handle member, upwardly turned lugs on the ends of the forked branches, said lugs respectively passing through a slot of said plate and through a slot and aperture of said blades, and a rod connecting said plate and lever whereby operation of the latter closes said cutter blades.

7. An edge trimmer for lawns comprising a handle member, a supporting plate carried by the lower end of said handle member, cutting blades pivotally mounted on said supporting plate, said plate at one side thereof having a forwardly extended portion which projects underneath the lower one of said cutting blades for a considerable portion of the length thereof, and mechanism for oscillating said blades in scissorslike manner.

In testimony whereof I hereunto affix my signature.

JOHN E. ERICKSON.